United States Patent
Büchler et al.

(10) Patent No.: US 7,184,375 B1
(45) Date of Patent: Feb. 27, 2007

(54) APPARATUS FOR SCANNING OPTICAL RECORDING MEDIA USING A DIFFERENTIAL PHASE DETECTION METHOD

(75) Inventors: Christian Büchler, Villingen-Schwenningen (DE); Marten Kabutz, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 764 days.

(21) Appl. No.: 09/579,736

(22) Filed: May 26, 2000

(30) Foreign Application Priority Data

May 31, 1999 (DE) ................. 199 24 733

(51) Int. Cl.
*G11B 7/00* (2006.01)
(52) U.S. Cl. ................. 369/44.35; 369/30.13
(58) Field of Classification Search ............ 369/44.29, 369/44.25, 44.26, 44.35, 44.37, 53.28, 53.34, 369/30.13; *G11B 7/00*
See application file for complete search history.

(56) References Cited

U.S. PATENT DOCUMENTS

| | | | | |
|---|---|---|---|---|
| 4,467,462 | A * | 8/1984 | Shibata ................. | 369/44.25 |
| 4,520,469 | A | 5/1985 | Todokoro et al. ............. | 369/44 |
| 4,544,838 | A * | 10/1985 | Musha et al. ............. | 369/44.34 |
| 4,616,354 | A | 10/1986 | Yoshida ................. | 369/44 |
| 4,654,838 | A | 3/1987 | Sugiki ................. | 369/46 |
| 5,258,968 | A * | 11/1993 | Matsuda et al. ......... | 369/44.35 |
| 6,014,354 | A * | 1/2000 | Nomura et al. ......... | 369/44.28 |
| 6,317,396 | B1 * | 11/2001 | Kuribayashi ............. | 369/44.35 |

FOREIGN PATENT DOCUMENTS

| | | |
|---|---|---|
| DE | 3409409 A1 | 9/1984 |
| DE | 19630887 A1 | 2/1998 |

OTHER PUBLICATIONS

MAT (Machine assisted translation) of JP 06-343039.*
MAT of JP 10-124890.*
MAT of JP 10-198981.*
Patent Abstracts of Japan vol. 1998, No. 12, Oct. 31, 1998 & JP 10 198981. Abstract enclosed.
Patent Abstracts of Japan vol. 1998, No. 13, Nov. 30, 1998 & JP 10 208262. Abstract enclosed.
Patent Abstracts of Japan vol. 1998, No. 10, Aug. 31, 1998 & JP 10 124890. Abstract enclosed.
Patent Abstracts of Japan vol. 1995, No. 3, Apr. 28, 1995 & JP 06 343039. Abstract enclosed.
European Search Report citing the above listed references AR, AS, AT, and AU.

* cited by examiner

*Primary Examiner*—A M Psitos
(74) *Attorney, Agent, or Firm*—Joseph J. Laks; Harvey D. Fried; Patricia Verlangieri

(57) ABSTRACT

An apparatus for reading from or writing to optical recording media, having a photodetector and a phase detector for detecting a phase difference between output signals of the photodetector. An object of the present invention is to propose an apparatus in which a phase signal which is as correct as possible is generated. A further object of the invention is to specify a method of which a correct track error signal is determined using a phase detection method. According to the invention, the apparatus has an edge sequence detector for detecting the sequence of edges of the output signals, and a signal blocking unit for blocking the output signal of the phase detector. In particular, the output signal of the phase detector is blocked when an impermissible sequence of zero crossings of phase detected signals.

17 Claims, 5 Drawing Sheets

APPARATUS FOR SCANNING OPTICAL RECORDING MEDIA USING A DIFFERENTIAL PHASE DETECTION METHOD

FIELD OF THE INVENTION

The present invention relates to an apparatus for reading from and/or writing to optical recording media which uses a phase detection method, in particular the differential phase detection method, abbreviated to DPD method, for tracking purposes.

BACKGROUND OF THE INVENTION

An apparatus of this type is disclosed in EP-A2-0 822 542. It has a four-quadrant photodetector, two diagonal sum generators, which sum signals from in each case two diagonally disposed quadrants of the photodetector, and a phase forming unit, which detects a phase difference between the diagonal summation signals. This phase difference is proportional to the deviation of a light beam, scanning the tracks of a recording medium, from the track centre. It is used as the track error signal in a tracking regulating circuit.

The known apparatus may be regarded as having the disadvantage that the phase angle of the diagonal summation signals relative to one another is determined incorrectly in certain cases. The result of this is that the track error signal assumes an incorrect value and, consequently, the tracking is not effected in an optimum manner. The phase angle is determined incorrectly for example when the scanning light beam deviates relatively far from the track centre and, in that case, signal influences occur which partly originate from the neighbouring track. In this case, it can happen that a correct phase angle cannot be determined.

SUMMARY OF THE INVENTION

An object of the present invention is to propose an apparatus in which a phase signal which is as correct as possible is generated. A further object of the invention is to specify a method by means of which a correct track error signal is determined using a phase detection method, in particular the DPD method.

The invention provides for the apparatus to have an edge sequence detector for detecting the sequence of edges of the output signals, that is to say of the signals to be evaluated, and a signal blocking unit for blocking the output signal of the phase forming unit. This has the advantage that no incorrect phase signal is output. The evaluation of the temporal sequence of the edges of the different diagonal summation signals makes it possible to identify whether an erroneous phase signal is detected. If the phase detection is erroneous, the outputting of a phase signal, which is erroneous in this case, is prevented. In general, the apparatus has a four-quadrant photodetector, but it likewise lies within the scope of the invention for the photodetector to have a smaller or a larger number of detector elements whose phase difference is evaluated directly or after prior combination or processing. If a four-quadrant detector is present, diagonal summation signals are generated which are used for the DPD method. The invention can generally be used for apparatuses in which a phase difference has to be determined, which presupposes at least two signals to be compared, but not necessarily the DPD method.

According to the invention, the signal blocking unit is arranged directly upstream or downstream of the phase detector, but the interposition of signal processing stages is also advantageous. The signal blocking unit then blocks the track error signal instead of the phase signal, for example.

According to the invention, the apparatus has diagonal summation signal forming units whose output signals are fed to the phase forming unit. This has the advantage that it is suitable for application of the DPD method.

It is advantageous for the phase forming unit and the edge sequence detector to be assigned edge detectors and phase angle detectors. In this case, an edge detector detects the presence of a steep rise or fall in a signal that is fed to it and is to be evaluated. A phase angle detector detects the temporal position of the steep rise or fall. In this case, the temporal position is preferably determined with respect to a clock signal of the apparatus. In this case, the edge-detector and phase-angle-detector output signals are fed to the phase forming unit for the purpose of determining the phase shift between the signals to be evaluated, in particular the diagonal summation signals, and to the edge sequence detector for the purpose of detecting the sequence of the edges. This has the advantage that what is involved in this case is a combination of signals which is suited to being evaluated both by the phase forming unit and by the edge sequence detector. The utilization of the required components is optimized. This also accelerates the evaluation of the signals or increases the accuracy. The nature of the edge, that is to say whether the edge is a rising or falling edge, is not required here for the evaluation, but it is advantageous to evaluate identical edges.

The invention provides for the phase forming unit and the edge sequence detector to be integrated in one another. This has the advantage that certain functions which can be jointly utilized only have to be realized once. This allows an integrated, space-saving design.

Furthermore, a fault indicator is provided, which, from the edge sequences determined, outputs a signal which characterizes the state of the apparatus. This has the advantage that the apparatus is operated optimally in a manner corresponding to the present state.

The invention's method for determining a correct track error signal in accordance with a phase detection method consists in the fact that the sequence of the edges of the signals whose relative phase is evaluated, for example diagonal summation signals, is checked with regard to impermissible sequences, and that the outputting of a phase value is prevented when an impermissible sequence is present. This has the advantage that the track error signal is formed in a highly correct manner, since the outputting of the phase signal is prevented only when it is erroneous with a high degree of probability. This is achieved by virtue of the fact that the signals from which the phase value is directly formed are checked in respect of whether they will lead to an erroneous phase signal. In this case, the edges are advantageously determined using zero crossings of the signals to be evaluated. The phase detection method used is, by way of example, the DPD method described above. The signals to be compared are then the diagonal summation signals, which is the name given below to the signals whose phase is detected. However, the method according to the invention can also be applied to other track error signal generation methods in which an item of phase information is evaluated.

A sequence of more than two successive zero crossings in one of the diagonal summation signals without a zero crossing occurring in the other diagonal summation signal in the same period of time is regarded as an impermissible sequence according to the invention. This has the advantage that what is involved in this case is an unambiguous condition for an impermissible edge sequence. When the scanning beam crosses from one side of the track centre to the other side, two successive zero crossings occur in one diagonal summation signal without a zero crossing occurring in the other diagonal summation signal in this period of time. This is a permissible sequence; a correct track error signal is formed in this case. However, as soon as three successive zero crossings occur in one of the diagonal summation signals before a zero crossing occurs in the other diagonal summation signal, an error is present. The phase value derived therefrom is generally incorrect.

Furthermore, if a sequence of more than one pair of zero crossings occurs within a predetermined time period, a zero crossing of one diagonal summation signal and a zero crossing of the other diagonal summation signal which takes place shortly thereafter being regarded as a pair of zero crossings, it is regarded as an impermissible sequence according to the invention. This has the advantage that the accuracy of the determination of the track error signal is increased further. By way of example, when the scanning beam changes from one track to the next track of the recording medium, it happens that signal components originating from two different tracks are evaluated. Although the edges of the diagonal summation signals then apparently occur in the correct order, they nevertheless have an excessively short time interval between them. On account of the structure of the recording medium, such a short time interval cannot occur if only signal components from a single track are evaluated. In this case too, an incorrect phase angle is determined which, according to the invention, is not used for determining the track error signal.

If an accumulation of impermissible sequences occurs, then an error indication signal is generated. This has the advantage that the error indication signal indicating a specific state of the system can be derived in a simple manner. A particularly large number of impermissible sequences occur when the scanning beam is situated between two tracks. If the frequency exceeds a specific value, then a fault indication signal indicating the inter-track state is output. If the recording medium exhibits scratches or is adversely affected in some other way, characteristic accumulations of impermissible sequences likewise occur, which are detected and output as error indication signal.

The invention furthermore provides for the diagonal summation signals to be evaluated in a predetermined clock cycle. In this case, a zero crossing is detected if one of two successive values of a diagonal summation signal lies above, and the other of the said values lies below, a reference value. The temporal position of this zero crossing is interpolated using the value or values lying above and/or below the reference value. This has the advantage that the diagonal summation signals are not evaluated in an uninterrupted manner, rather digitized values can be used. Accurate determination of the phase angle is nonetheless carried out by means of the interpolation. In this case, the clock cycle and the interpolation method should be suitably coordinated with one another; if the clock signal has a large width, if appropriate a number of values before and after the zero are accordingly included in the interpolation, which is then preferably non-linear interpolation.

The phase between a zero crossing of one diagonal summation signal and a zero crossing of the other diagonal summation signal is determined from the respective interpolated value of the temporal position. If a number of complete clock cycles lie between the zero crossings, a value corresponding to the number of these clock cycles is additionally added. This has the advantage that the accuracy of the value of the phase is increased over and above the temporal resolution predetermined by the clock cycle. As a result, on the one hand, a more accurate track error signal is formed on account of the more accurate phase angle and, on the other hand, the rate at which impermissible sequences are identified is increased since the higher temporal resolution leads to a smaller number of zero crossings which are interpreted as coinciding in time.

The invention provides for the track error signal to be extrapolated in the event of an impermissible sequence of zero crossings in the diagonal summation signals. The last valid value of the track error signal is kept here in the simplest case. A linear or higher extrapolation from the last values before the impermissible sequence is likewise advantageously possible, however. During the absence of a present phase value, the track error signal assumes a value which comes close to the next calculated value to be expected. This has the advantage that no abrupt change occurs in the track error signal and, consequently, reliable tracking is ensured.

It goes without saying that the present invention is not just restricted to the embodiments specified in concrete terms but also includes modifications and developments which are within the ability of a person skilled in the art. Further advantages of the invention are also specified with regard to the preferred exemplary embodiments, which are described below with reference to the figures.

DETAILED DESCRIPTION OF PREFERED EMBODIMENTS

Figure 1:
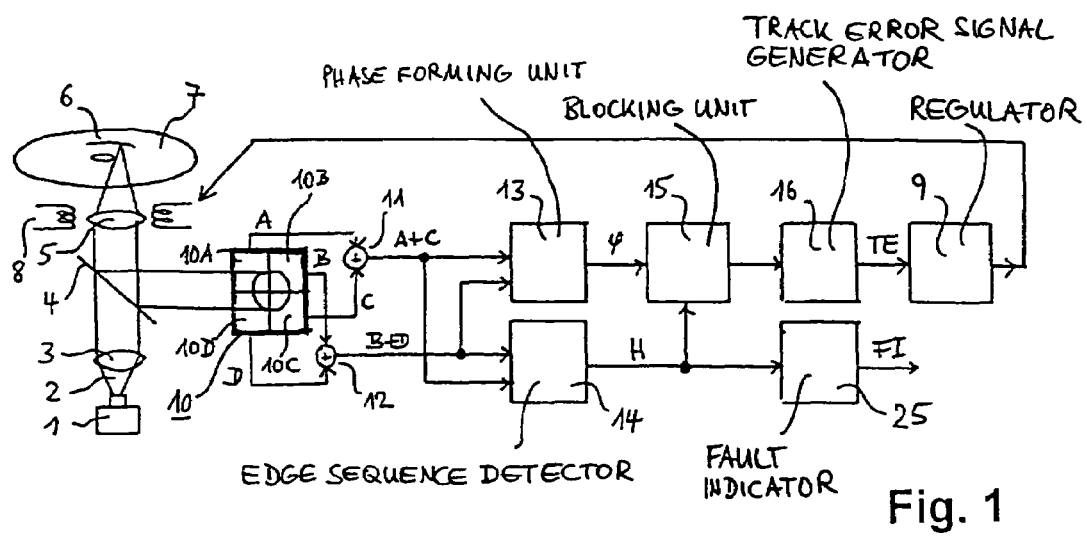
FIG. 1 shows part of an apparatus according to the invention in a schematic illustration.

FIG. 1 shows part of an apparatus according to the invention in a schematic illustration. A laser diode 1 emits a scanning beam 2, which is concentrated by a collimator 3. After passing through a semi-transparent mirror 4, the scanning beam 2 is focused onto an information track 6 of an optical recording medium 7 by a focusing lens 5. The optical recording medium 7 is in the form of a circular disc on which there is a spiral information track 6, only a small part of which is illustrated in the figure. By means of an actuator 8, indicated as a coil here, the focusing lens 5 can be moved parallel to the direction of propagation of the scanning beam 2, for the purpose of focusing, and in the radial direction with respect to the optical recording medium 7, for the purpose of tracking. The actuator 8 is driven by a regulator 9 for this purpose.

The scanning beam 2 focused onto the information track 6 is reflected from the optical recording medium 7, passes through the focusing lens 5 and is directed onto the photodetector, which is a four-quadrant detector 10 in the exemplary embodiment, by the semi-transparent mirror 4. The detector elements 10A, 10B, 10C and 10D of the four-quadrant detector 10 output detector signals A, B, C and D, respectively, depending on the intensity of the light which falls onto them. The signals A and C of the diagonally disposed detector elements 10A and 10C are fed to a diagonal summation signal forming unit 11, whose output signal is the first diagonal summation signal A+C. The detector signals B and D of the diagonally disposed detector elements 10B and 10D are fed to a diagonal summation signal forming unit 12, whose output signal is the second diagonal summation signal B+D. The first and second diagonal summation signals A+C and B+D are fed to a phase forming unit 13, which outputs a phase shift between its two input signals as a phase difference signal $\phi$. The diagonal summation signals A+C and B+D are furthermore fed to an edge sequence detector 14, which checks the sequence of edges or other characteristic features of the diagonal summation signals A+C and B+D. It outputs a stop signal H to a blocking unit 15 in the event of a sequence which indicates an error. The blocking unit 15 then prevents the phase difference signal $\phi$ from being forwarded to a track error signal generator 16. If the blocking unit 15 is not active, then the track error signal generator 16 generates a track error signal TE from the phase difference signal 4. The said track error signal is fed as an actual value to the regulator 9.

A fault indicator 25 is connected to the edge sequence detector 14 and evaluates the accumulation of erroneous sequences. In the exemplary embodiment, the stop signal H is fed to the said fault indicator. If stop signals H amounting to more than a specific predeterminable value occur per unit time, then the fault indicator 25 outputs an error indication signal FI. The fault indicator 25 is a counter in the simplest case.

The schematic illustration of FIG. 1 specifies only one of the possible arrangements of the individual elements of the apparatus. By way of example, the blocking unit 15 may also be arranged between the track error signal generator 16 and the regulator 9. The track error signal generator 16 may be integrated in the phase detector 13 in this case. However, it is likewise possible for the track error signal generator 16 to be integrated in the regulator 9.

According to a variant of the invention, the track error signal generator 16 from FIG. 1 also forms a track error signal TE when the blocking unit 15 is activated, that is to say no updated phase difference signal $\phi$ is present at its input. To that end, according to a first variant, the preceding track error signal TE is kept until an updated phase difference signal $\phi$ is present. According to another variant, for each clock cycle, the track error signal TE is linearly extrapolated from the values of the track error signal of the two preceding clock cycles.

Figure 2:
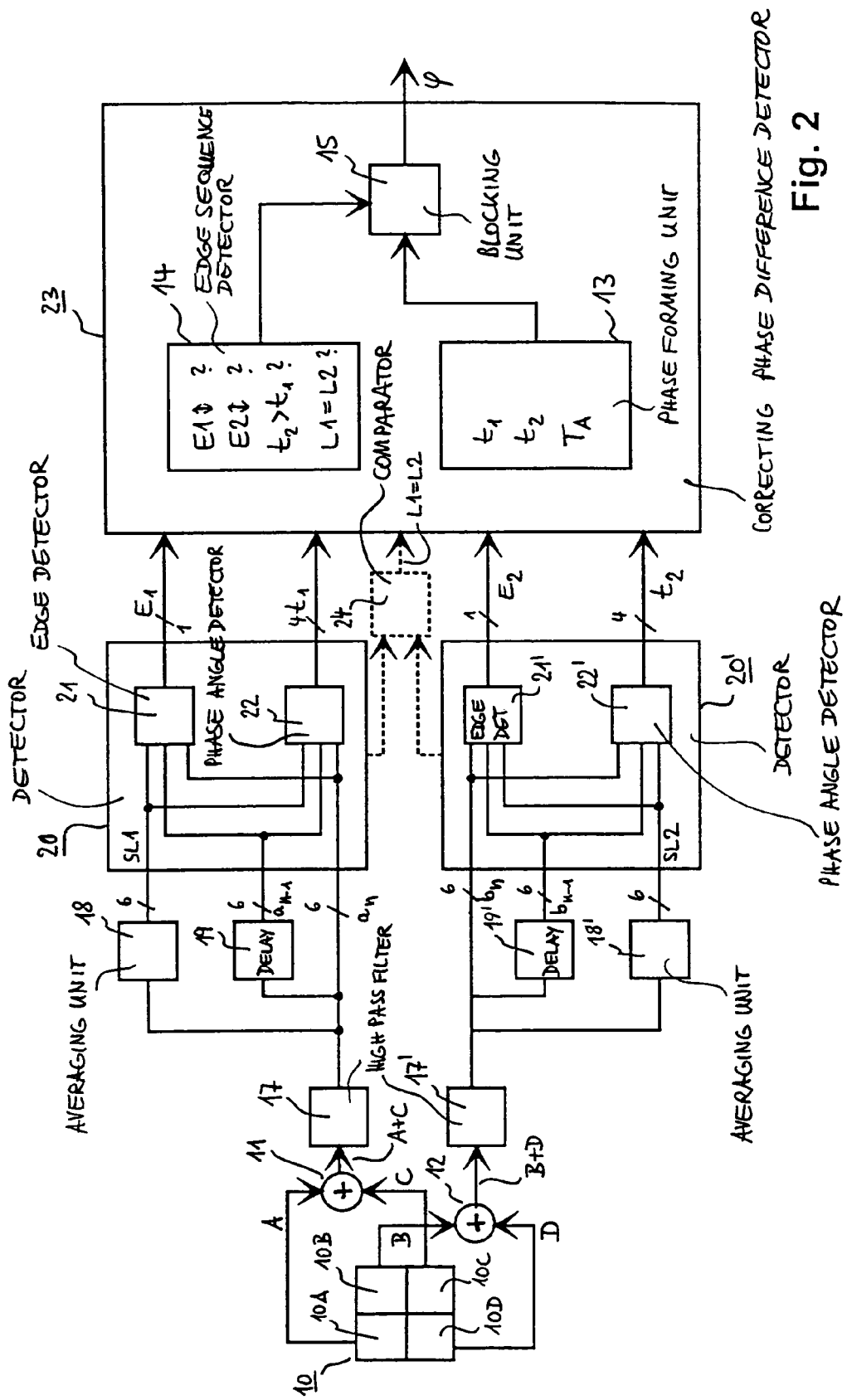
FIG. 2 shows part of an apparatus according to the invention in a schematic illustration.

FIG. 2 shows a variant of an apparatus according to the invention in which the phase forming unit 13, the edge sequence detector 14 and the blocking unit 15 are integrated in a correcting phase difference detector 23. Parts which are identical to those in FIG. 1 are provided with the same reference symbols. The illustration shows only the region, between the four-quadrant detector 10 and the output, at which the phase difference signal $\phi$ is present. In the exemplary embodiment, the diagonal summation signals A+C and B+D are present as digital values with a resolution of 6 bits, for example. They each pass through an FIR high-pass filter 17, 17' and are fed directly to an averaging unit 18, 18' via a delay element 19, 19' and to a detector 20, 20'. It is possible to dispense with the high-pass filter 17, 17', with the functionality of the apparatus being restricted if appropriate only to a minor extent or to an almost indiscernible extent. The output signal of the high-pass filter 17 is designated by $a_n$, and the signal delayed by a clock cycle T is designated by $a_{n-1}$. The average value output by the averaging unit 18 is designated by SL1. In a corresponding manner, the output signal of the high-pass filter 17' is designated by $b_n$, the output signal of the delay element 19' is designated by $b_{n-1}$ and the output signal of the averaging unit 18' is designated as average value SL2.

The detector 20 has an edge detector 21 and a phase angle detector 22. The edge detector 21 outputs a signal E1 with a resolution of one bit when an edge occurs in the first diagonal summation signal A+C. To that end, the edge detector 21 evaluates the average value SL1 and the signals $a_n$ and $a_{n-1}$. The edge signal E1 differs from zero only when one of the signals $a_n$, $a_{n-1}$ assumes a value which is greater than the average value SL1, while the respective other signal $a_{n-1}$ or $a_n$ assumes a value which is less than the average value SL1. If both signals $a_n$ and $a_{n-1}$ are greater, or both are less, than the average value SL1, then the edge signal E1 remains at the value zero. The phase angle detector 22 determines the time $t_1$ between the zero crossing of the diagonal summation signal A+C and the subsequent clock cycle T. In the exemplary embodiment, the time $t_1$ is output as a 4-bit value and is a measure of the phase shift of the diagonal summation signal. In a corresponding manner, the edge detector 21' and the phase angle detector 22' of the detector 20' form the output values of the edge signal E2 and the time $t_2$ from the signals $b_n$ and $b_{n-1}$ and the average value SL2.

In the correcting phase difference detector 23, the times $t_1$ and $t_2$ and an accumulated clock time $T_A$ are used by the phase detector 13 to determine the phase difference signal $\phi$. The edge sequence detector 14 evaluates the edge signals E1 and E2 and also the logical expression $t_2 > t_1$, in order, if necessary, to activate the blocking unit 15. One variant of the exemplary embodiment of FIG. 2 provides a comparator 24, which additionally compares the values of the edge signals E1, E2. Its output signal L1=L2 indicates whether the edge signals E1, E2 were equal or not equal in the respective prior state. This likewise indicates erroneous sequences, as will be described further below with reference to FIG. 5.

Figure 3:
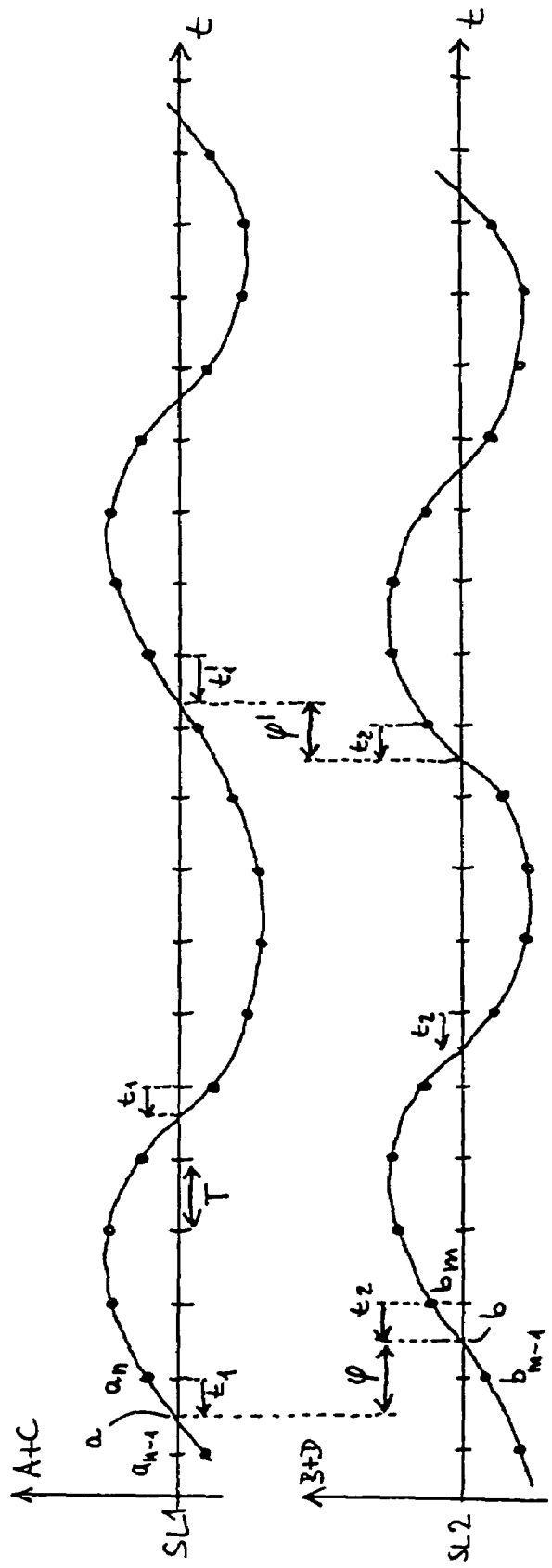
FIG. 3 shows diagonal summation signals which occur in an apparatus according to the invention.

In FIG. 3, the diagonal summation signals A+C and B+D are plotted against the time t by way of example. The subdivisions of the time axis t correspond to the clock cycle T in which the digitized diagonal summation signal A+C or B+D is evaluated. The corresponding discrete values of the diagonal summation signal A+C or B+D are marked by dots. The diagonal summation signals A+C and B+D oscillate about the average value SL1 and SL2, respectively, which is depicted as being constant in FIG. 3, for the sake of simplicity, this corresponding to a large time constant of the averaging unit 18 and 18', respectively.

The phase difference $\phi$ between the zero crossings, respectively marked by a and b, of the diagonal summation signals A+C and B+D is entered by way of example in the left-hand part of FIG. 3. Since the zero crossings a, b generally do not coincide with the clock cycle T, their temporal position, the time $t_1$ and $t_2$, respectively, is interpolated from the next clock cycle. In the simplest case, to that end linear interpolation is performed using the value $a_n$ following the zero a, and using the value $a_{n-1}$ preceding the zero, and using the clock cycle T: $t_1 = T*(a_n-a)/(a_n-a_{n-1})$. In this case, the average value SL1 is assumed for the value of the zero a: a=SL1. In a corresponding manner, the time $t_2$ is determined from the value $b_m$ following the zero b, and the value $b_{m-1}$ preceding the zero: $t_2 = T*(b_m-b)/(b_m-b_{m-1})$, where b=SL2 is also fixed here for the zero. The indices m and n in this case denote a consecutive numbering of the individual clock cycles. Between the values $a_n$ and $b_m$, there happen to be thus (m−n) clock cycles. The times $t_1$ and $t_2$ are determined by the phase angle detector 22 and 22', respectively.

The phase difference φ is determined from the time $t_1$ and the sum of the clock times T between $a_n$ and $b_m$ minus the time $t_2$: $\phi = t_1 + (m-n)*T - t_2$. This determination is effected in the phase difference detector 23, in which the phase forming unit 13 determines the phase difference signal φ. The number of clock cycles T is also referred to below as the accumulated time $T_A$, where $T_A = (m-n)*T$.

FIG. 3 represents a change in the phase angle of the diagonal summation signals A+C and B+D relative to one another: the first diagonal summation signal A+C leads in the left-hand part of FIG. 3, and the second diagonal summation signal B+D leads in the right-hand part. A further phase difference signal φ' is depicted in the right-hand part of the figure. It is composed of the time $t_1'$ minus the sum of the clock times between the zeros and minus the time $t_2'$: $\phi' = t_1' + (m-n)*T - t_2'$. In this case, the value m is less than the value n.

In the edge detector 21 a check is made to see whether two successive digitized values $a_n$, $a_{n-1}$ of the diagonal summation signal A+C are greater than the average value SL1: the inequalities $a_n > SL1$ and $a_{n-1} > SL1$ are checked. If both statements yield the same result, then a zero crossing is not present; if they yield different results, then a zero crossing is present and the edge signal E1 is set from the value zero to the value one.

Figure 4:
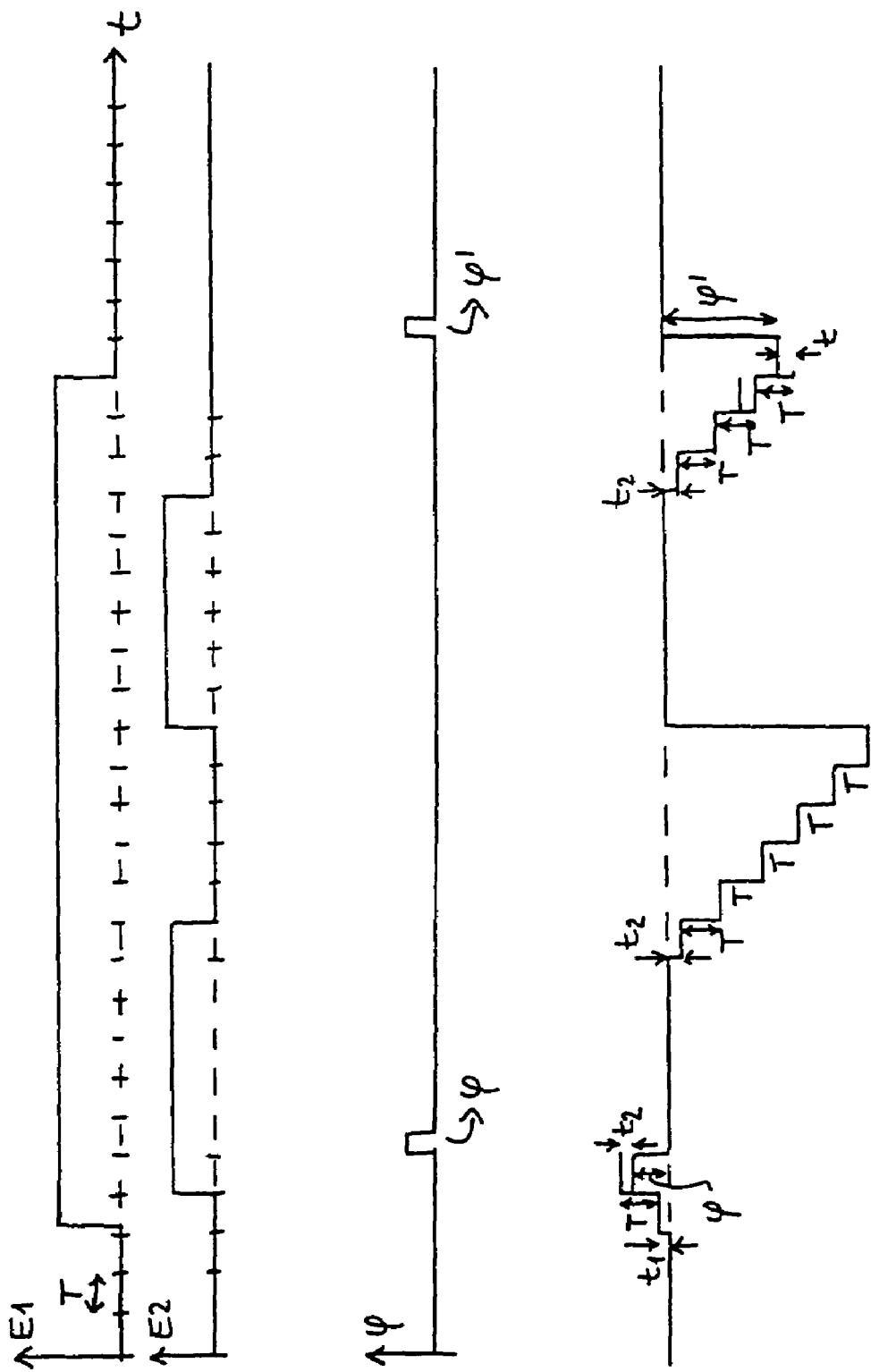
FIG. 4 shows a signal diagram of signals which occur in an apparatus according to the invention.

FIG. 4 shows a signal diagram of signals which occur in an apparatus according to the invention. The following are plotted against the time t, from top to bottom: the edge signal E1, the edge signal E2, an accumulated phase $\phi_A$, which is composed of the times $t_1$, $t_2$ and the accumulated time $T_A$, and the output phase difference signal φ.

The edge signals E1, E2 change their values when a zero crossing occurs in the corresponding diagonal summation signal A+C, B+D. FIG. 4 illustrates a faulty edge sequence: between two changes in the value of the edge signal E1 there are four changes in the edge signal E2. After the first change in the edge signal E1, the time $t_1$ is added to the value of the accumulated time $T_A$, which was zero beforehand. Upon the succeeding change in the edge signal E2, which takes place after one clock cycle T in the example, a clock time T is added to the accumulated phase $\phi_A$ and the time $t_2$ is subtracted from this. The phase $\phi_A$ accumulated in this way is then output as a phase difference signal φ and then reset to zero. Upon the next transition of the signal E2, the time $t_2$ is subtracted from the accumulated phase $\phi_A$ whose value had been set to zero beforehand. With each further clock cycle, the clock time T is subtracted from the accumulated phase $\phi_A$. The next edge that follows occurs in the second diagonal summation signal B+D; the edge signal E2 changes. What is involved in this case is an impermissible sequence; therefore the edge sequence detector 14, by means of the blocking unit 15, prevents the outputting of a phase difference signal φ corresponding to the accumulated phase $\phi_A$. At the same time, the accumulated phase $\phi_A$ is set to zero. Upon the next change in the edge signal E2, the accumulation of the times $t_1$, $t_2$ and T is begun again. When the change in the edge signal E1 occurs, the time $t_1$ is added to the accumulated phase $\phi_A$, a corresponding phase difference signal φ' is output, and the accumulated phase $\phi_A$ is subsequently set to zero.

Figure 5:
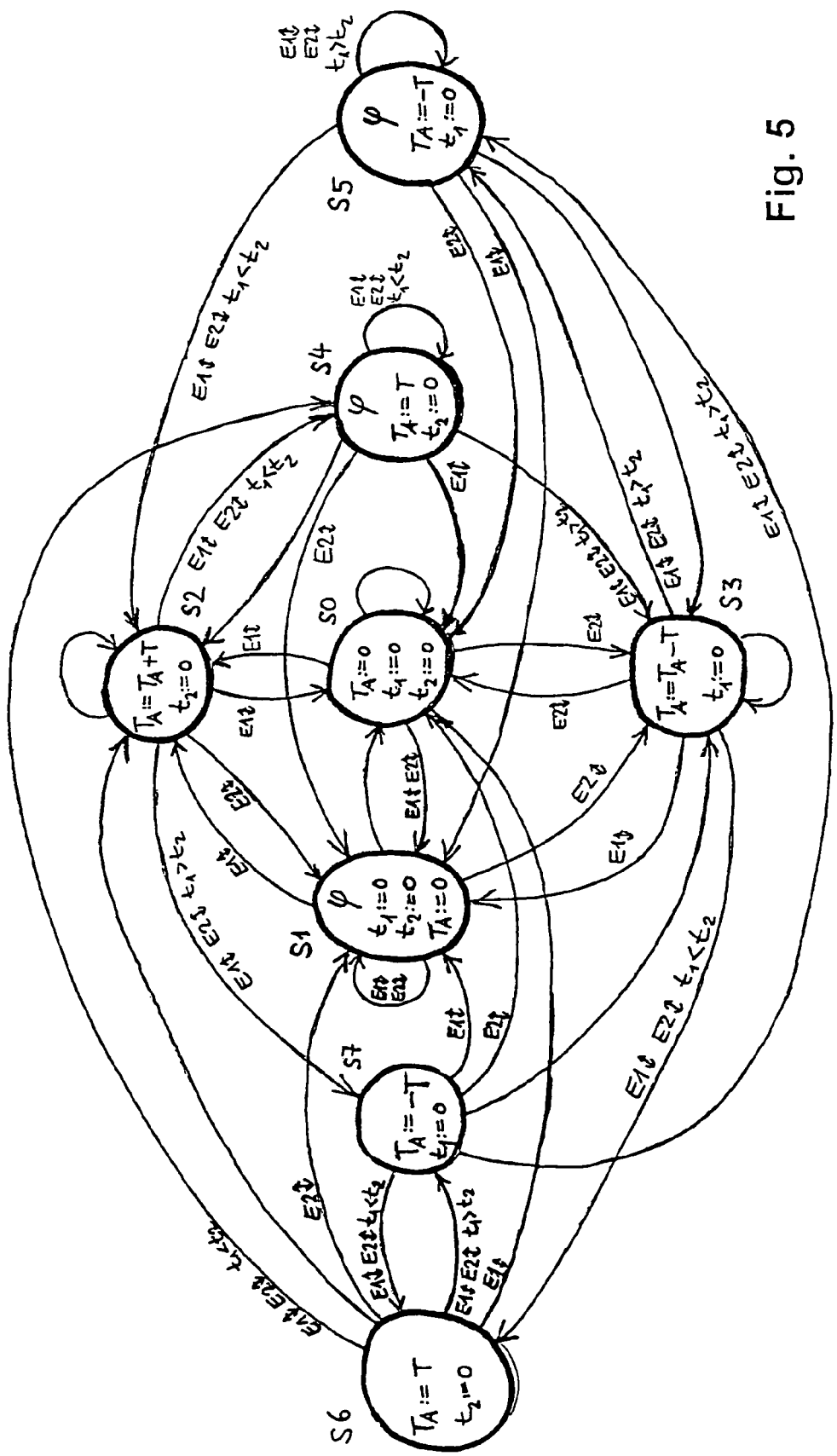
FIG. 5 shows a state diagram concerning the functional sequence of an apparatus according to the invention.

FIG. 5 shows a state diagram concerning the functional sequence of an apparatus according to the invention. Different states S0 to S5 are indicated as bordered zones within which are specified the operations performed in the respective state of the correcting phase difference detector 23. The arrows between the states are provided with conditions under which a change is made from one state to the other in the direction of the arrow.

In the text below, the principle behind the state diagram will be described, starting with the description of the state S0, without going into every detail which can be comprehended from the description of the principle and the details contained in the state diagram.

The operations performed in the state S0 are the resetting of the value of the accumulated time $T_A$ and those of the times $t_1$, $t_2$ to the value zero. If no change occurs in the edge signals E1, E2 within the next clock cycle, then the state S0 is maintained. This is indicated by the arrow located on the right-hand side of the zone representing the state S0. The said arrow begins and ends in the state S0; it does not bear a condition detail. If, on the other hand, both edge signals E1 and E2 change proceeding from the state S0, then a transition is made to the state S1. This is illustrated by the arrow which points from the state S0 to the state S1 and is marked with the conditions E1 and E2. If, proceeding from the state S0, just the edge signal E1 changes, then a transition is made to the state S2. This is illustrated by the arrow which points from the state S0 to the state S2 and bears the condition E1 specified there. In a corresponding manner, a branching from the state S0 to the state S3 is effected if just the edge signal E2 changes within a clock cycle. This is also illustrated by means of a corresponding arrow provided with the condition E2.

The arrows which end at the zone representing the state S0 indicate the conditions under which a transition is made from the other states to the state S0. Such a transition takes place from the state S1 if no change occurs in the edge signals E1, E2 within a clock period. A branching from the state S2 to the state S0 is effected if a change occurs only in the edge signal E1 within a clock period. A transition from the state S3 to the state S0 is made if a transition takes place only in the edge signal E2 within a clock period. A transition from the state S4 to the state S0 takes place if only a change in the edge signal E1 takes place within a clock period. A transition from the state S5 to the state S0 takes place if a change occurs only in the edge signal E2, but not in the edge signal E1.

In the state S1, firstly a phase difference signal φ is output per clock cycle. It is determined in accordance with the formula $\phi = t_1 + T_A - t_2$, where $t_1$, $t_2$ and $T_A$ assume the values determined in one or more of the preceding clock cycles. The outputting of the phase difference signal φ is followed by resetting of $t_1$, $t_2$ and $T_A$ to the value 0. This is illustrated by the specification of the letter φ and of the definitions $t_1$: =0, $t_2$: =0 and $T_A$: =0 in the zone representing the state S1. Thus, if the state S1 were reached from the state S0, then the accumulated time $T_A$ has the value $T_A = 0$ set in the state S0. In this case, the times $t_1$ and $t_2$ have values which were determined with respect to the corresponding zero crossings, which also caused the change in the edge signals E1 and E2. The transitions which proceed from the state S1 and end in the state S1 are illustrated by arrows provided with conditions, as described with regard to the state S0.

In the state S2, the accumulated time $T_A$ is increased by the clock time T after each clock cycle. As a result, the sum (m−n)*T of the clock cycles occurring between the occurrence of the edge signal E1 and the succeeding change in the edge signal E2 is formed, which sum is described further above. The time $t_2$ is set to zero in the state S2, since, in the event of a correct sequence of zero crossings, it is to be expected that the state S2 will be followed by a transition of the edge signal E2 and hence a new time $t_2$. If a transition occurs only in the edge signal E2 in a subsequent clock cycle, then a transition is made from the state S2 to the state S1. If, on the other hand, a transition occurs only in the edge signal E1, then that corresponds to an incorrect edge sequence and a transition to the state S0 is therefore made. The time $T_A$ accumulated up to that point and the times $t_1$ and $t_2$ are no longer taken into account in this case. A special feature of the state S2 in comparison with the states S0 and S1 is that when both edge signals E1 and E2 change their state within a clock cycle, their sequence or order is also taken into consideration for the purpose of determining the next state. If the change in the edge signal E1 occurs before that in the edge signal E2, that is to say if the time $t_1$ is greater than the time $t_2$, then an incorrect sequence is present; a transition to the state S7 is made. If, on the other hand, the transition in the edge signal E2 occurs before that in the edge signal E1, in other words if $t_1$ is less than $t_2$, then a branching to the state S4 is effected. Similar checking of the order of the occurrence of the transitions in the edge signals E1 and E2 which occur in the same clock cycle is effected from the state S3. In the event of an incorrect sequence, that is to say if the transition in the edge signal E2 occurs before that in the edge signal E1, then a transition to the state S6 is made; if the order is reversed, a branching to the state S5 is effected. In the state S3, with each clock cycle the accumulated time $T_A$ is reduced by a clock time T; the time $t_1$ is set to zero.

In the state S4, the phase difference signal $\phi$ is output in accordance with the formula $\phi=t_1+T_A-t_2$, the accumulated time $T_A$ is subsequently set to the value of a clock time T, and the time $t_2$ is set to zero. It is also the case when proceeding from the state S4 that if there is a transition both in the edge signal E1 and in the edge signal E2, the sequence of the said signals is taken into account. If, in the subsequent clock cycle, firstly a change occurs in the edge signal E2 and then in the edge signal E1, then the state S4 is maintained in the next clock cycle as well. If the order is reversed, a transition to the state S3 is made. The same applies correspondingly to the state S5, in which, in the event of a correct sequence, first of all a change in the edge signal E1 should be expected. In the event of an incorrect order, in other words if first of all a change occurs in the edge signal E2, then either a branching to the state S0 is effected, if only the edge signal E2 has changed within a clock cycle. If both edge signals E2 and E1 have changed, then a branching to the state S2 is effected.

According to a variant of the invention, in a departure from the illustration in FIG. 5, the arrows which proceed from S4, S5 and bear the condition that the edge signal E1 end the edge signal E2 both change within a clock cycle end in the state S0. This takes account of the assumption that if there is a very short temporal sequence of changes in the edge signal, and thus of zero crossings, an error must be present and the resulting information is thus erroneous with a very high degree of probability and should not, therefore, be evaluated.

The states S6 and S7 with associated transitions will not be described in detail here since this can be comprehended from the details in the figure and from the description given above of the other states and transitions.

In the case of the exemplary embodiment in accordance with the state diagram according to FIG. 5, the fact of whether forbidden orders of edges have occurred is reliably identified. In the case of an incorrect start state, the sequence of subsequent states always remains incorrect, however. This is avoided by the introduction of a further input signal L1=L2, also see FIG. 2. The input signal indicates whether the edge signals E1, E2 were equal or not equal in the respective prior state. The values of the edge signals should be equal in the states S0 and S1, and they should not be equal in the states S2 to S7. A violation of this rule indicates an incorrect prior state. Since it is not clear which prior state is correct, this variant, which is not explicitly depicted in the figure, provides for resetting to a predetermined subsequent state for the error situation, in this case to the state S0.

Figure 6:
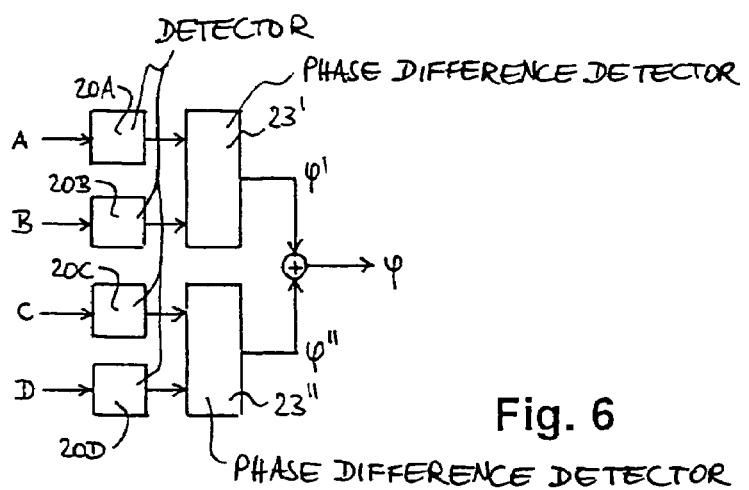
FIG. 6 shows part of an apparatus according to the invention in a schematic illustration.

FIG. 6 shows an alternative configuration for the evaluation of the detector signals A, B, C, D. In this case, each of the detector signals A, B, C, D is individually fed to a detector 20A, 20B, 20C, 20D, which outputs an edge position signal in a manner corresponding to the detectors 20, 20' described above. The edge position signal contains both information about the occurrence of an edge, corresponding to the edge signal E1, E2, and information about the temporal position of the said signal, corresponding to the times $t_1$, $t_2$. The edge position signals of the detectors 20A, 20B are fed to a first correcting phase difference detector 23', which outputs a phase difference signal $\phi'$. This signal is determined for example in the manner described above. A corresponding phase difference signal $\phi''$ is output by the phase difference detector 23'', which evaluates the edge position signals of the detectors 20C and 20D. Although one of the phase difference signals $\phi'$, $\phi''$ is actually sufficient for determining a track error signal TE, the two signals are combined again in accordance with FIG. 6 and output as a phase difference signal $\phi$. The simplest form of combination is summation.

Figure 7:
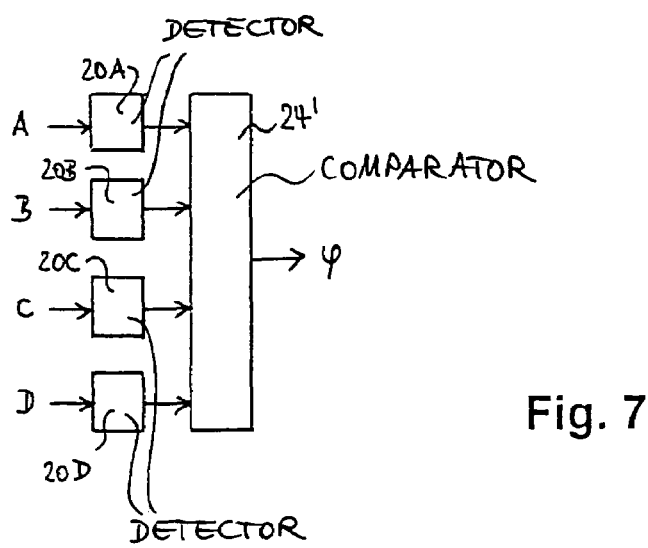
FIG. 7 shows part of an apparatus according to the invention in a schematic illustration.

FIG. 7 shows part of a further variant of an apparatus according to the invention in a schematic illustration. In this case, the detector signals A, B, C, D are each fed individually to detectors 20A, 20B, 20C, 20D, whose output signals, the edge position signals, are in this case fed to a comparator 24', which suitably evaluates the states in order to determine a phase difference signal $\phi$.

The invention thus relates to tracking systems in playback apparatuses for DVD-movie, DVD-ROM, DVD-RW, DVD-R, CD, CD-ROM, CD-RW, CD-R etc., and corresponding recording apparatuses. It is often the case that in contemporary playback apparatuses, for tracking according to the DVD method a conventional phase detector is used for determining the time interval between the edges of the diagonal summation signals A+C and B+D. This phase detector is intended to determine the interval between two edges of its two input signals. For example, it outputs at one of its two outputs a pulse which corresponds to the time difference between the edges at its inputs. It can happen, especially when a phase detector is used for tracking according to the DPD method, that the input signals A+C and B+D do not change in pairs. A customary phase detector cannot recognize this and outputs incorrect pulse lengths at its outputs in such cases. The outputting of such incorrect pulse lengths is suppressed according to the invention.

The time intervals between the edges of the two diagonal summation signals A+C, B+D are a measure of the track deviation of the scanning beam 2. If the scanning beam 2 captures the track centre of an information track 6 exactly, the diagonal summation signals A+C and B+D ideally have the same form and sequence. This means that the signals A+C and B+D have rising or falling edges at the same time. The output signal of a conventional phase comparator is zero in this case.

If the scanning beam 2 has a constant yet slight displacement with respect to the track centre, then the sequence of the diagonal summation signals A+C and B+D is still the same, but the edges of these signals no longer occur simultaneously. If, by way of example, the positive or the negative edge of the signal A+C occurs before that of the signal B+D, then the time interval between the edges is determined as the phase difference signal φ by the phase comparator. In this case, the order of the input edges can be seen in the sign of the value of the phase difference signal φ. The phase comparator thus outputs a value proportional to the track deviation for the phase difference signal φ, the polarity of this value indicating the direction of the track deviation and the magnitude indicating the distance from the track centre. The value of the phase difference signal φ is present as a digital value; a representation or conversion into another representation such as two's complement, offset binary, or the like, is therefore possible.

A large number of information tracks 6 lie next to one another on a recording medium 7. The track error signal TE is therefore a periodic signal when a plurality of tracks are crossed. If, by way of example, the scanning beam 2 moves towards the region between two tracks, that is to say away from a track centre, then the value of the phase difference signal φ and hence the value of the track error signal φ increase. This occurs for as long as the scanning beam 2 can still detect the information track 6 away from which it is moving. If the scanning beam 2 is situated exactly between two tracks, then the sequence of the edges of the diagonal summation signals A+C and B+D is not certain, since the scanning beam 2 captures a mixture of signals from two tracks. The sequence of edges appears more randomly here and the resulting track error signal TE goes back to small values. If the scanning beam 2 moves further towards the next track, then the sequence of the edges originating from the next track is defined again and the value of the track error signal TE shows the track deviation that is then valid.

As described above, the sequence of input signals differs from the track centre to the region between two tracks in that the sequence of the edges of the diagonal summation signals A+C and B+D on the information track 6 is uniform and only exhibits a displacement proportional to the track deviation. Between the tracks, however, the sequence of the diagonal summation signals A+C and B+D is more random, since the scanning beam 2 in this case captures a mixture of signals from two tracks. Paired edges from the diagonal summation signals A+C and B+D do not occur in this case. According to the invention, output values for the phase difference signal φ which would be based on such incorrect edges are suppressed. The state diagram according to FIG. 5 shows, by way of example, whether a high-low sequence of one input signal, for example the diagonal summation signal A+C, is likewise contained in the respective other signal, in this case B+D. In this case, the order of at most one edge of one signal is allowed to change with respect to the edge in the other signal. If at least two edges successively change their order with regard to the respective other signal considered, then this is a violation of the allowed order and has the effect that the value determined for the phase difference signal φ is not output.

A situation as described above may additionally indicate that the scanning beam 2 is located between the tracks. Since the forbidden orders between the tracks do not occur fundamentally but in an accumulated manner, filtering is performed here with the aid of a counter or other techniques in order to reliably identify this. A fundamental possibility consists in statistically evaluating the forbidden edge orders v which are present in a sequence of n edges, and in outputting an error indication signal FI, which identifies the region between the tracks, in the event of a predetermined value u=n−v being undershot. If the proportion of valid sequences n−v within the total number n of sequences considered falls below a predetermined value u, then scanning between two tracks is the situation present. Furthermore, the error indication signal FI can also show whether the order of the edges of the signals A+C and B+D is disturbed owing to a scratch or another cause of error on the recording medium 7. Further methods which allow statistical evaluation of the number of invalid edges, such as, for example, evaluation per unit time or in relation to a predetermined total number of edges, lie within the scope of the invention. Further—ones which differ from the exemplary embodiments—state machines or algorithms, realized in a program, for identifying forbidden edge sequences and for suppressing the outputting of the phase value determined also lie within the scope of the present invention, as does a different way of evaluating the violation of edge sequences.

What is claimed is:

1. An apparatus for reading from or writing to optical recording media, comprising:
   a photodetector with at least two detector elements;
   a phase forming unit for detecting a phase difference between output signals of the photodetector;
   an edge sequence detector for detecting a sequence of edges of the output signals; and
   a signal blocking unit for blocking an output signal of the phase forming unit when an impermissible sequence of edges is detected.

2. The apparatus according to claim 1, wherein the signal blocking unit blocks a signal which is derived from the output signal of the phase forming unit or is used to form the output signal.

3. The apparatus according to claim 2, further comprising diagonal summation signal forming units having inputs connected to the detector elements of the photodetector and providing the output signal.

4. The apparatus according to claim 3, further comprising edge detectors and phase angle detectors, to which the output signals are fed and whose outputs are connected to the phase forming unit and to the edge sequence detector.

5. The apparatus according to claim 2, further comprising edge detectors and phase angle detectors, to which the output signals are fed and whose outputs are connected to the phase forming units and to the edge sequence detector.

6. The apparatus according to claim 1, further comprising diagonal summation signal forming units having inputs connected to the detector elements of the photodetector and providing the output signal.

7. The apparatus according to claim 1, further comprising edge detectors and phase angle detectors, to which the output signals are fed and whose outputs are connected to the phase forming unit and to the edge sequence detector.

8. The apparatus according to claim 1, wherein the phase forming unit and the edge sequence detector are integrated.

9. The apparatus according to claim 1, further comprising a fault indicator connected to an output of the edge sequence detector.

10. A method for determining a correct track error signal utilizing a phase detection method, comprising the steps of:
    checking a sequence of zero crossings whose phases are detected with regard to impermissible sequences; and
    preventing the outputting of a phase value when an impermissible sequence is detected.

11. The method of claim 10, wherein a sequence of more than two successive zero crossings of one of the signals without the occurrence of a zero crossing in another of the signals is an impermissible sequence.

12. The method of claim 10, wherein a sequence of more than one pair of zero crossings within a predetermined time period, a pair of zero crossings consisting of a zero crossing of one of the signals and a succeeding zero crossing of another one of the signals, is an impermissible sequence.

13. The method of claim 10, wherein an error indication signal is generated as a function of the accumulation of impermissible sequences.

14. The method of claim 10, wherein the signals are evaluated in a predetermined clock cycle, a zero crossing being present if one of two successive values of the signal lies above, and the other of said values lies below, a reference value, and the temporal positions of the zero crossing is interpolated using these two values.

15. The method of claim 14, wherein the phase value between a zero crossing of one signal of the signals and a zero crossing of another of the signals is determined from the respective interpolated temporal position and the number of clock cycles lying between the zero crossings.

16. The method of claim 10, further comprising the step of extrapolating the track error signal in the event of an impermissible sequence.

17. The method of claim 10, wherein the phase detection method is a differential phase detection method, the signals to be compared being the diagonal summation signals.

* * * * *